United States Patent
De Pompignan

(10) Patent No.: US 7,878,518 B2
(45) Date of Patent: Feb. 1, 2011

(54) MOTOR VEHICLE FLEXIBLE AXLE, COMPRISING A CROSS BRACING WITH OPEN CROSS-SECTION WHEREOF THE FLANKS INCLUDE NON-RECTILINEAR EDGES, CROSS BRACING AND CORRESPONDING MOTOR VEHICLE

(75) Inventor: Alexis De Pompignan, Le Mans (FR)

(73) Assignee: Auto Chassis International SNC, Le Mans (FR)

( * ) Notice: Subject to any disclaimer, the term of this patent is extended or adjusted under 35 U.S.C. 154(b) by 140 days.

(21) Appl. No.: 11/995,616

(22) PCT Filed: Jul. 10, 2006

(86) PCT No.: PCT/FR2006/050693

§ 371 (c)(1),
(2), (4) Date: Nov. 4, 2008

(87) PCT Pub. No.: WO2007/007002

PCT Pub. Date: Jan. 18, 2007

(65) Prior Publication Data
US 2009/0066050 A1    Mar. 12, 2009

(30) Foreign Application Priority Data
Jul. 13, 2005  (FR) ................................. 05 07566

(51) Int. Cl.
*B60B 35/06* (2006.01)
(52) U.S. Cl. .................. 280/124.107; 280/124.116; 280/124.166; 267/273; 301/124.1
(58) Field of Classification Search .................. 267/273; 180/905; 29/897.2; 280/124.116, 124.153, 280/124.128, 124.166, 124.106, 124.107; 301/124.1, 127
See application file for complete search history.

(56) References Cited

U.S. PATENT DOCUMENTS

| 5,409,254 | A | * | 4/1995 | Minor et al. .......... 280/124.166 |
| 6,059,314 | A | | 5/2000 | Streubel et al. |
| 6,152,468 | A | | 11/2000 | Glaeser et al. |
| 7,204,498 | B2 | * | 4/2007 | Alesso et al. .......... 280/124.106 |
| 2004/0032106 | A1 | * | 2/2004 | Park .................... 280/124.107 |

FOREIGN PATENT DOCUMENTS

| EP | 1 036 678 | 9/2000 |
| EP | 1 256 468 | 11/2002 |
| EP | 1 314 587 | 5/2003 |
| JP | 58 053504 | 3/1983 |
| JP | 2000-52733 A * | 2/2000 |
| JP | 2001-113925 A * | 4/2001 |

* cited by examiner

*Primary Examiner*—Ruth Ilan
(74) *Attorney, Agent, or Firm*—Oblon, Spivak, McClelland, Maier & Neustadt, L.L.P.

(57) ABSTRACT

The invention concerns a motor vehicle flexible axle comprising two longitudinal arms (20) connected by a cross bracing (10) with open cross-section whereof the flanks (11), (21) have each an edge (1), (2) extending between docking zones (4) with the ends of said cross bracing. The invention is characterized in that said edges (1), (2) have a non-rectilinear shape enhancing their tensioning when said cross member is subjected to torsion, said tensioning enabling said docking zones (4) to be relieved of stresses due to said torsion.

12 Claims, 5 Drawing Sheets

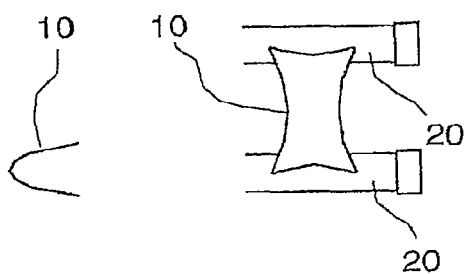 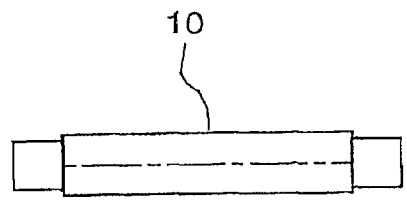
| Fig. 1a | Fig. 1b | Fig. 1c |
| Background Art | Background Art | Background Art |
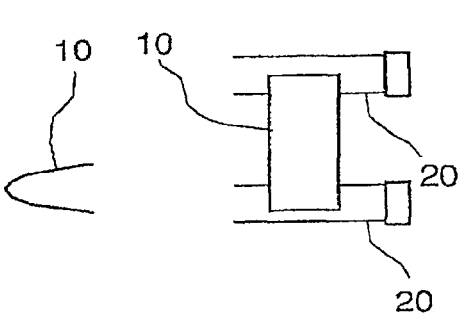 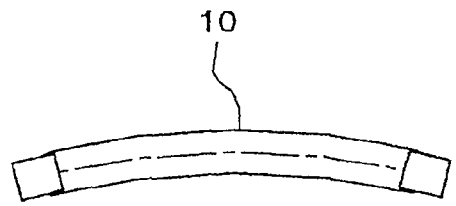
| Fig. 2a | Fig. 2b | Fig. 2c |
| Background Art | Background Art | Background Art |
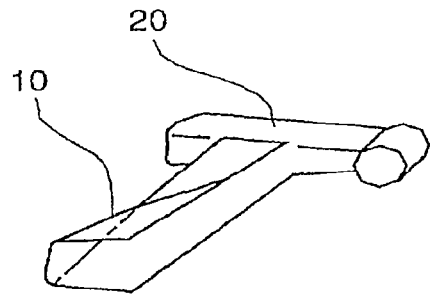  
| Fig. 3a | Fig. 3b | Fig. 3c |
| Background Art | Background Art | Background Art |

MOTOR VEHICLE FLEXIBLE AXLE, COMPRISING A CROSS BRACING WITH OPEN CROSS-SECTION WHEREOF THE FLANKS INCLUDE NON-RECTILINEAR EDGES, CROSS BRACING AND CORRESPONDING MOTOR VEHICLE

BACKGROUND

The field of the invention is that of motor vehicles. More specifically, the invention relates to flexible axles for motor vehicles.

It will be recalled that a flexible axle is the term generally given to an axle that has been designed to form a torsion element between two wheels.

Conventionally, a flexible axle has comprised two longitudinal arms each bearing a support for mounting a wheel and which are connected by a transverse connecting element known as a crossbrace or profile section.

During the process of designing an axle there are two parameters which, amongst others, are given consideration when assessing the quality of the axle. These are bending and torsion.

The principle of flexible axles means that good bending stiffness can be allied with relative torsional flexibility. In general, it is through the geometry of the cross section of the crossbrace, by way of its bending and torsional moments of inertia, that the desired compromise between bending stiffness and (relative) torsional flexibility is reached.

The cross sections chosen for producing crossbraces made of steel (or any other isotropic material) are often V-shaped, U-shaped, or L-shaped because these types of geometry display an advantageous relationship between bending inertia and torsional inertia.

The last few years have seen the flexible axle technique increasingly spread to the middle and lower end of the automotive construction spectrum thanks to the many advantages they display, these including an excellent compromise between the features they can present and the architecture, and the fact that they can be produced economically chiefly by use of all-welded construction.

These advantages have led the designers of ground contact systems toward constant technological developments in their latest versions. This is because flexible axles do suffer from a certain number of limitations including a delicate compromise between longitudinal and transverse stiffnesses and an endurance which is governed by the durability of each of their component parts which are subjected to significant elastic deformations.

The connecting element, or crossbrace, is one of the most difficult components to develop, particularly from a durability standpoint. Aside from the integrity of the crossbrace body, the regions of abutment against the arms, these abutment regions generally being welded, are particularly highly stressed and development engineers have to give this area a great deal of attention in order to avoid premature breakage of the connection.

Various types of crossbrace and various ways of mounting these between the longitudinal arms of the axle are known.

In a first known technique illustrated by FIGS. 1a, 1b and 1c, the crossbrace 10 has a V-shaped cross section over the entire length of the crossbrace. Furthermore, the height of the flanks of the crossbrace increases at the ends of the crossbrace so as to increase the footprint of the crossbrace on the arms 20.

In a second technique illustrated by FIGS. 2a, 2b and 2c, the crossbrace 10 is bent in the YZ plane (and is therefore generally termed a "banana" beam crossbrace). A crossbrace such as this, of open section with the opening facing toward the rear once mounted, has cutouts at its ends into which the arms 20 are butted. In this state of the art these arms are generally square and this leads to not insignificant additional costs because of the need to resort to certain bending, squashing, etc. operations.

In a third technique illustrated in FIGS. 3a, 3b and 3c, the crossbrace 10 is bent in the YZ plane and in addition has an evolving cross section which starts out with a V-shape in the central region of the crossbrace and ends up in a trapezoidal shape at the ends of the crossbrace.

In this instance it is found that, sooner or later depending on how the vehicle is used, the welded connections between the crossbrace and the longitudinal arms begin to degrade.

Now, an analysis of these phenomena has led to the observation that the weld beads at the crossbrace/arm interface are working in a "peeling" mode, this type of loading corresponding to a known weakness of welded seams which arises in particular out of the orientation of their metallographic structure as they cool.

Another axle technique has been proposed in the prior art, and this is illustrated in FIGS. 4a, 4b, 4c and 4d.

According to this technique, the crossbrace 1 once mounted has an open section with the opening facing downward, this tending to raise the center of torsion of the axle and giving it better elasto-kinematic behavior.

As can be seen in FIGS. 4a, 4b, 4c and 4d, the crossbrace 10 is positioned substantially at right angles to the longitudinal arm 20, the end of the crossbrace 10 being designed to espouse the shape of the arm 20.

To achieve this, the crossbrace laterally has two abutment portions 11 the shape of which corresponds to the shape (generally cylindrical) of the arm. These abutment portions 11 are conventionally extended in such a way that the crossbrace covers the top of the arm 20.

FIG. 4d clearly shows that a connecting portion 14 connects the two abutment portions of the crossbrace, forming a corner 111 with each of these.

With this type of solution, it is regularly found that the welds are highly loaded at the ends of the seam, and more especially at the corners 111 of the crossbrace 1. This may cause cracks to appear in the weld, these cracks ultimately breaking the welded seam into two. In some instances, these cracks even spread into the axle arm.

Clearly it will be appreciated that this can cause significant damage to the axle, it being possible for this to have repercussions on the level of safety offered by the vehicle equipped with the axle in question.

In any event, it is desirable to eliminate or, at the very least to limit, the aforementioned deterioration.

In addition, when significant loadings are exerted on the abutment regions, particularly as a result of successive bendings of the crossbrace, the corners 111 tend to puncture the wall of the longitudinal arm. In other words, these corners 111, under the effect of vibrations and jolts transmitted by the vehicle, experience micro-movements toward the inside of the arm and ultimately hammer (in the manner of a center punch) the wall of the arm.

This repeated hammering ultimately leads to cracking of the wall of the arm and/or to peeling of the welded seam.

To remedy this situation, one solution might be to increase the wall thickness of the longitudinal arms in order to increase their strength.

However, this would have the consequence of increasing the weight of the longitudinal arms.

In order to limit this hammering phenomenon, one technique has been proposed by the Applicant Company to introduce relative flexibility into the ends of the crossbrace. This is achieved by, for example at each end of the crossbrace, producing a cutout. However, this technique entails performing a step of machining or cutting out the crossbrace before the crossbrace undergoes its pressing operation, and this adds a further step to the axle manufacturing schedule and tends to increase its cost.

BRIEF SUMMARY

It is a particular objective of the invention to alleviate the disadvantages of the prior art.

It is a more specific objective of the invention to propose a technique for more reliably and more durably making the connection between the crossbrace and the longitudinal arms of the flexible axle, by comparison with the solutions of the prior art.

In this respect, one objective of the invention in particular is to provide an axle such as this which eliminates, or at the very least limits, the risks of arm cracking caused by the crossbrace, and the phenomenon whereby the welded seams peel in the regions where the crossbrace is butted together with the arms.

Another objective of the invention is to provide an axle such as this which is of simple design and can be assembled more easily and/or more quickly than with the conventional solutions of the prior art.

A further objective of the invention is to provide an axle such as this which is inexpensive and easy to use.

These objectives, together with others which will become apparent later on, are achieved by virtue of the invention, a subject of which is a flexible axle for a motor vehicle, comprising two longitudinal arms connected by an open-section crossbrace the flanks of which each have an edge running between abutment regions situated at the ends of said crossbrace, characterized in that said edges have a non-rectilinear shape encouraging them to be tensioned when said crossbrace is subjected to torsion, said tensioning being intended to relieve said abutment regions of the stresses due to said torsion.

In this way, the edges are longer than the distance separating the two longitudinal arms.

This "excess" length introduces relative flexibility into the edges. In other words, because the edges are longer than they need be they are, when not stressed, in a "relaxed" state, the "excess" length making it possible, using only a small amount of effort, to tension the edges when the axle is subjected to torsion.

Because the torsional strength is low at the edges, stresses are encouraged to dissipate at the edges and, as a result, at the flanks of the crossbrace, this considerably limiting the stresses applied to the abutment regions where the crossbrace butts against the longitudinal arms.

The risks of damage to the connection like those already mentioned with reference to the prior art are thus limited, thus increasing the durability of the axle (the endurance of the connections at the butted joints thereby in theory being appreciably extended).

Furthermore, a result such as this is obtained while at the same time maintaining the elasto-kinematic features of the axle, as will become more clearly apparent later on.

According to a preferred solution, said edges starting from a substantially central region of said crossbrace progressively diverge from one another toward said abutment regions.

According to an advantageous solution, said progressive divergence increases from said central region toward said abutment regions.

However, it is entirely conceivable, according to another conceivable embodiment, for the separation to decrease from the central region of the crossbrace, giving this crossbrace, when viewed from beneath, a bulging appearance. An embodiment such as this would, however, tend to increase the space occupied by the crossbrace in order to maintain a sufficient footprint of the crossbrace on the arms at the abutment region.

According to a first preferred embodiment, each of said edges has a curved shape the radius of curvature of which increases from said central part toward said abutment regions.

According to a second embodiment, each of said edges is in the form of an arc of a circle.

As a preference, said crossbrace is secured to said arms in such a way that said open section faces downward.

As mentioned previously, an architecture such as this makes it possible to raise the center of torsion of the axle, and this may be required in certain manufacturer specifications.

According to a preferred embodiment, said crossbrace has, over at least part of its length, a substantially horizontal flat connecting said flanks.

In this case, said crossbrace preferably has a V-shaped cross section which evolves in such a way that said crossbrace has an essentially trapezoidal cross section at each of its ends.

Thus, relative torsional flexibility is maintained while at the same time allowing the crossbrace to be widened at the abutment regions with a view to enlarge the connection between the crossbrace and the arms of the axle.

It will be noted that the branches of the V-section may be connected by a flat of length appreciably shorter than the flat of the trapezoidal cross section at the ends.

According to an advantageous solution, said flat is extended at each of said ends of said crossbrace in such a way as to exhibit a securing portion for securing to said longitudinal arms.

In this case, said flat is preferably welded, at each of said ends of said crossbrace, in such a way as to provide a securing portion with said longitudinal arms.

This then yields the possibility of securing the crossbrace to the arms by a longer length of weld than was used in the prior art, thus improving the durability of the axle.

According to one conceivable alternative form, it comprises at least one stiffness-adjusting piece attached between said flanks near each of the ends of said crossbrace.

In this case, said edges have, preferably near each of said ends of said crossbrace, a substantially straight portion, said stiffness-adjusting pieces being attached between said flanks at said substantially straight portions of said edges.

This then yields a reliable securing region (the flanks being planar or almost planar in this region) for securing the adjustment elements to the crossbrace.

The invention also relates to a flexible axle crossbrace for a motor vehicle, intended to connect two longitudinal arms, said crossbrace having an open section the flanks of which each have an edge running between abutment regions at the ends of said crossbrace, characterized in that said edges have a non-rectilinear shape encouraging them to be tensioned when said crossbrace is subjected to torsion, said tensioning being intended to relieve said abutment regions of the stresses due to said torsion.

The invention also relates to a motor vehicle equipped with a flexible axle comprising two longitudinal arms connected by an open-section crossbrace the flanks of which each have an edge running between abutment regions situated at the ends of said crossbrace, characterized in that said edges have a non-rectilinear shape encouraging them to be tensioned when said crossbrace is subjected to torsion, said tensioning being intended to relieve said abutment regions of the stresses due to said torsion.

BRIEF DESCRIPTION OF THE DRAWINGS

Other features and advantages of the invention will become more clearly apparent from reading the following description of one preferred embodiment of the invention which is given purely by way of illustrative and nonlimiting example and from consulting the attached drawings among which:

FIGS. 1a, 1b and 1c are views of a first embodiment of a flexible axle according to the prior art;

FIGS. 2a, 2b and 2c are views of a second embodiment of a flexible axle according to the prior art;

FIGS. 3a, 3b and 3c are views of a third embodiment of a flexible axle according to the prior art;

DETAILED DESCRIPTION

As mentioned earlier, the principle of the invention lies in the fact that the flanks of the crossbrace have an edge shape which, when the crossbrace is subjected to torsion, is able to dissipate some of the torsional stresses at the edges by encouraging these to become tensioned, this dissipation being aimed at limiting the stresses applied to the crossbrace/arm joint.

Figure 4A:
FIGS. 4a, 4b, 4c and 4d are views of a fourth embodiment of a flexible axle according to the prior art.
Figure 4B:
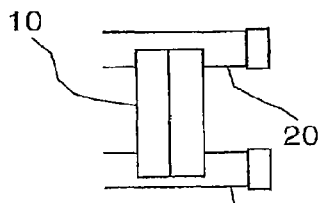
Figure 4C:
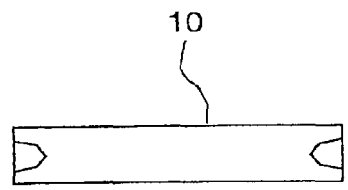
Figure 4D:
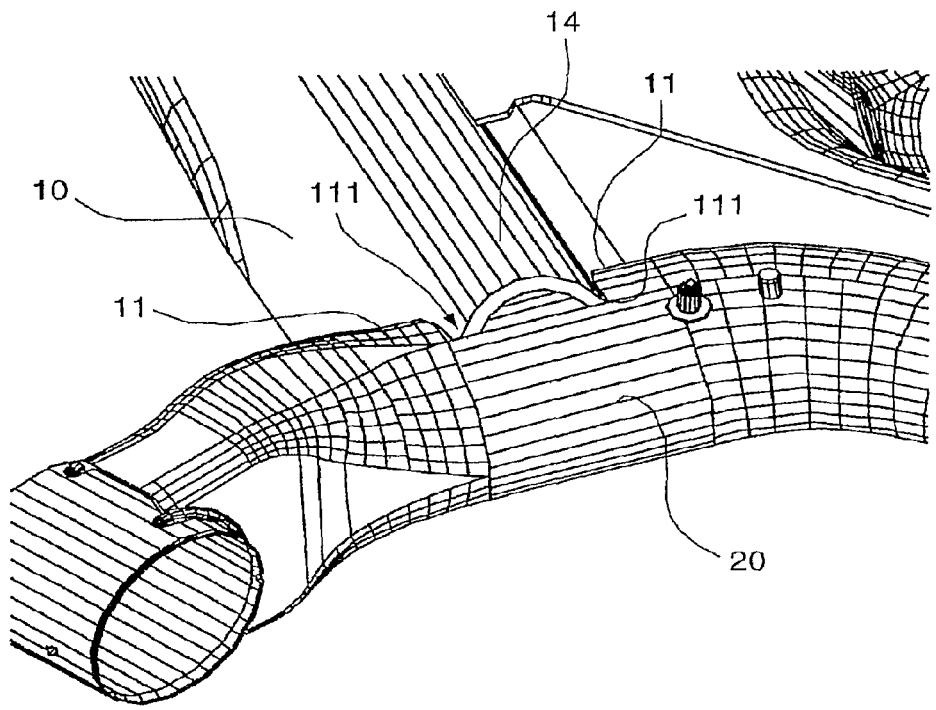
Figure 5:
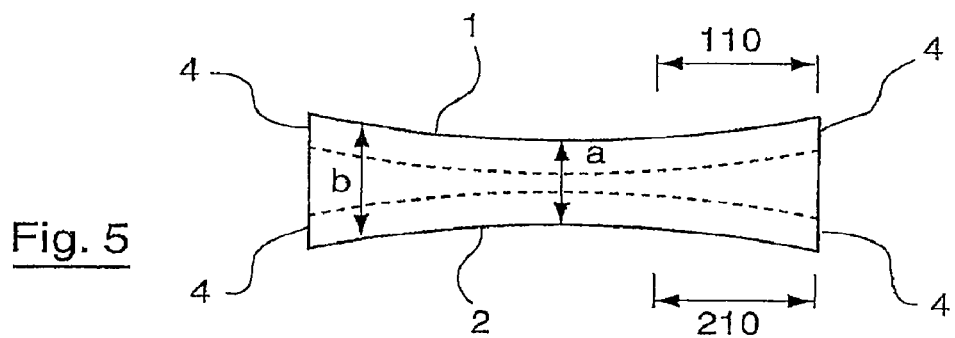
FIG. 5 is a schematic view from beneath of an axle crossbrace according to the invention.
Figure 8:
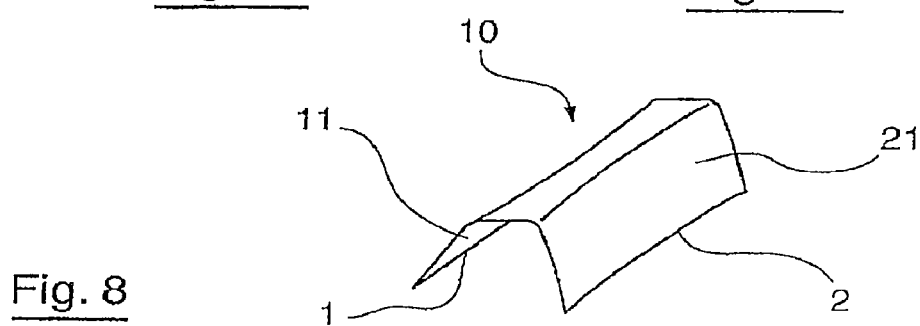
FIG. 8 is another perspective view of an axle crossbrace according to the invention.

One preferred embodiment of the invention is illustrated by FIGS. 5 and 8 which show an axle crossbrace according to the invention.

As can be seen, the edges 1, 2 of the flanks 11, 21 of the crossbrace 10 have a non-rectilinear shape which means that their length is greater than the distance separating the two longitudinal arms that the crossbrace connects.

Figure 6:
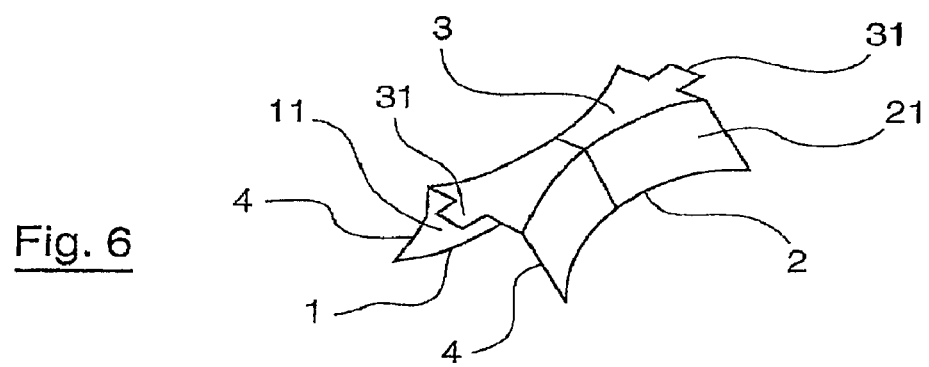
FIG. 6 is a schematic perspective view of an axle crossbrace according to the invention.

According to the present embodiment, the flanks 11, 21 have a curvature clearly visible in FIGS. 6 and 8 (and deliberately exaggerated in FIG. 6 for the purposes of clarity), this curvature being manifested in a curved shape at the edges 1, 2.

This curvature means that there is an excess length that can be put to use when tension is applied to the crossbrace so that, when the vehicle experiences a cross-fall (which tends to increase the distance between the two abutment regions at which the crossbrace butts against the arms), the edges become tensioned, this tending to cause them to adopt a straight (or less curved) shape.

Thus, any "pulling" on the ends of the crossbrace when the vehicle experiences a cross-fall (which pulling is the phenomenon observed when the edges have a length substantially equal to the distance separating these two longitudinal arms) is avoided, thus reducing the stress applied to the crossbrace abutment regions 4.

As illustrated by FIG. 5, the edges 1, 2 have relative curvatures which are such that the separation a between the edges in the central region is less than the separation b between the edges near the abutment regions 4.

More specifically, the separation between the edges increases progressively from the central part of the crossbrace toward the abutment regions.

According to the embodiment illustrated by FIG. 5, the curvature of the edges 1, 2 has a radius of curvature which increases progressively from the central part of the crossbrace toward the abutment region.

Thus, near each end of the crossbrace, the flanks 11, 21 have a substantially planar portion 110, 210 (the edges being substantially straight in this portion) favorable to the securing, between the flanks of the crossbrace, of a crossbrace stiffness adjusting piece.

Figure 10:
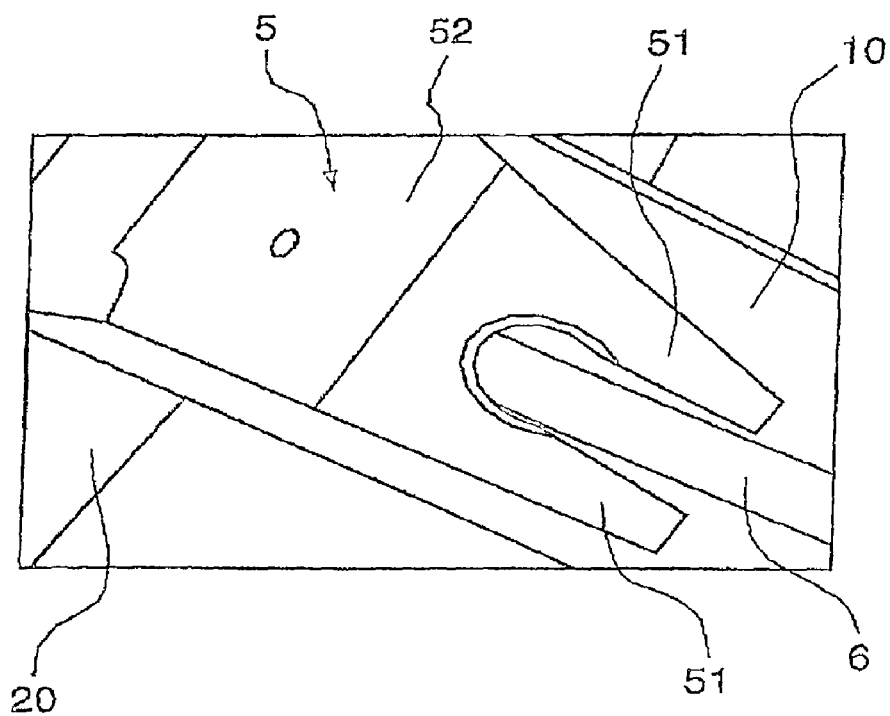
FIG. 10 is a partial view of an axle according to the invention showing a gusset attached between the crossbrace and a longitudinal arm.

An adjusting piece such as this consists, according to the embodiment illustrated by FIG. 10, of a gusset 5 running between a longitudinal arm 20 and the crossbrace 10.

A gusset such as this is welded to the arm 20, on the one hand and, on the other hand, to the crossbrace 10 via two branches 51 which leave space between them for the passage of an anti-roll bar 6 positioned inside the crossbrace.

The two branches 51 thus provide a transition between the crossbrace and the arm by progressively reducing the warping effect of the crossbrace, this effect being allowed at the branches (which have a degree of freedom relative to each other) and prevented at the one-piece gusset part which butts against the arm.

Furthermore, a gusset according to the present embodiment runs in two planes: a substantially horizontal first plane in which there runs an abutment surface 52 the end of which is welded to a longitudinal arm (the lateral sides of this surface in addition being welded to the flanks of the crossbrace), and a second plane in which the branches 51 run, these "dipping down" from the abutment surface 52 toward the inside of the crossbrace 10 (the branches 51 also being welded to the flanks of the crossbrace).

Figure 11:
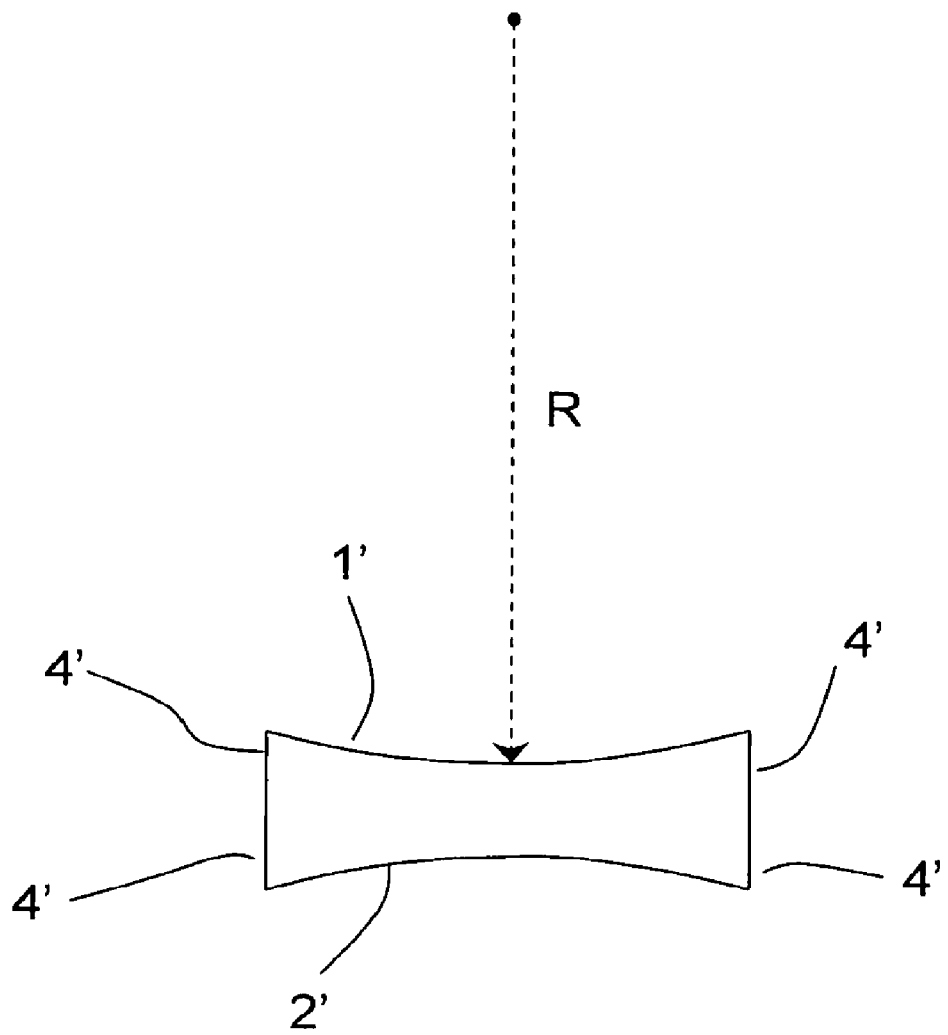
FIG. 11 is a view showing an exemplary crossbrace with edges in the shape of arcs of a circle.

It will be noted that, according to another conceivable embodiment and, in particular, when there are no stiffness adjusting elements like those mentioned hereinabove, the edges 1', 2' of the crossbrace may be in the shape of arcs of a circle having a radius R, as shown in FIG. 11. The crossbrace includes abutment regions 4'.

Figures 7A, 7B:
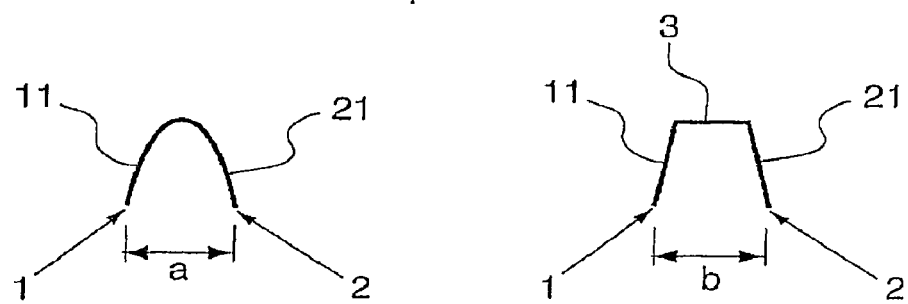
FIGS. 7a and 7b are each sectioned views of an axle crossbrace according to the invention, in a central region and in an end region of the crossbrace, respectively.

With reference to FIGS. 7a and 7b, the crossbrace additionally has an evolving cross section which comprises a V-shape in the central part (FIG. 7a) of the crossbrace for evolving into a trapezoidal shape toward the ends (FIG. 7b) of the crossbrace.

This means that there is a flat 3 on the top of the crossbrace, this flat widening toward the ends of the crossbrace.

Figure 9:
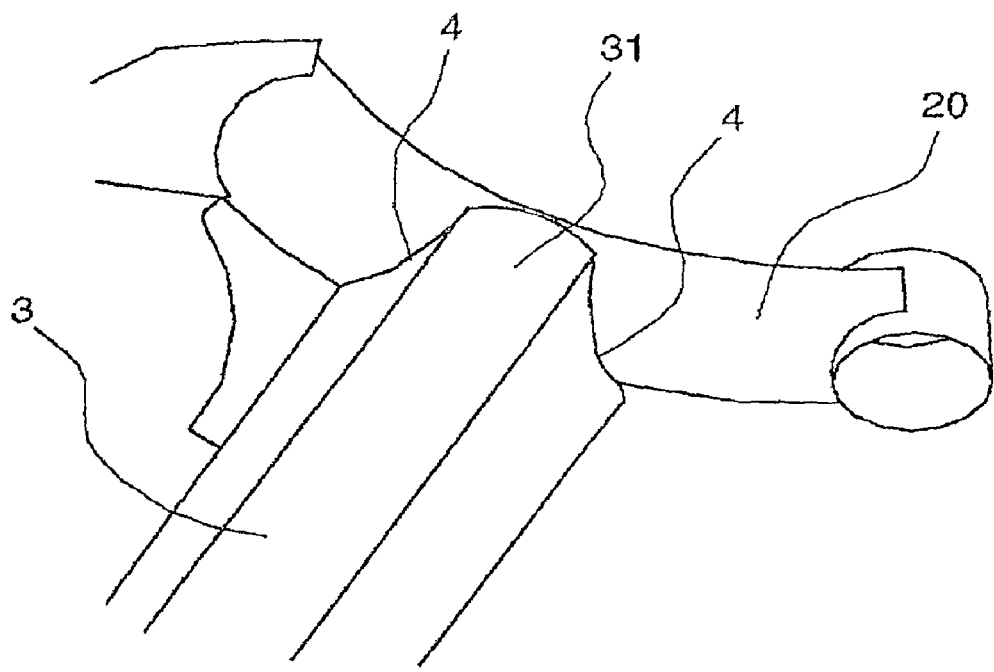
FIG. 9 is a partial view of an axle according to the invention showing the abutment between the crossbrace and a longitudinal arm.

With reference to FIG. 9, the flat 3 is extended at each end of the crossbrace to form a lug 31. This lug constitutes a portion for securing the crossbrace to the longitudinal arms.

According to the embodiment illustrated by FIG. 9, the crossbrace has, at each of its ends, abutment regions 4 which, according to the present invention, are formed by cutouts made in the flanks such that they espouse the shape of the arms.

With the crossbrace mounted on the arm in such a way that its section is open downward, the arms fit into the cutouts 4, then a welded seam is produced at the interface between the cutouts 4 of the flanks and the corresponding arms 20.

Furthermore, the lug 31 comes into contact with the upper part of the arm 20, a welded seam also being made at the interface between the lug 31 and the arm 20.

The invention claimed is:

1. A flexible axle for a motor vehicle, comprising:
    two longitudinal arms connected by an open section crossbrace including flanks and a substantially horizontal flat connecting the flanks, each of the flanks having an edge running between abutment regions situated at ends of the crossbrace;
    wherein the crossbrace includes, in a substantially central region, a V-shaped cross section that evolves such that the crossbrace has an essentially trapezoidal cross section at each of the ends of the crossbrace, and
    wherein the edges have a non-rectilinear shape encouraging the edges to be tensioned when the crossbrace is subjected to torsion, the tensioning to relieve the abutment regions of stresses due to the torsion.

2. The flexible axle as claimed in claim 1, wherein the edges starting from the substantially central region of the crossbrace progressively diverge from one another toward the abutment regions.

3. The flexible axle as claimed in claim 2, wherein the progressive divergence increases from the central region toward the abutment regions.

4. The flexible axle as claimed in claim 1, wherein each of the edges has a curved shape with a radius of curvature that increases from the central region toward the abutment regions.

5. The flexible axle as claimed in claim 1, wherein each of the edges is in a form of an arc of a circle.

6. The flexible axle as claimed in claim 1, wherein the crossbrace is secured to the arms such that the open section faces downward.

7. The flexible axle as claimed in claim 1, wherein the flat is extended at each of the ends of the crossbrace so as to exhibit a securing portion for securing to the longitudinal arms.

8. The flexible axle as claimed in claim 7, wherein the flat is welded, at each of the ends of the crossbrace, to the corresponding longitudinal arm.

9. The flexible axle as claimed in claim 7, further comprising at least one stiffness-adjusting piece attached between the flanks near each of the ends of the crossbrace.

10. The flexible axle as claimed in claim 9, wherein the edges include, near each of the ends of the crossbrace, a substantially straight portion, the at least one stiffness-adjusting piece being attached between the flanks at the substantially straight portions of the edges.

11. A flexible axle crossbrace for a motor vehicle, configured to connect two longitudinal arms, the crossbrace comprising:
    an open section including flanks and a substantially horizontal flat connecting the flanks, each of the flanks having an edge running between abutment regions at ends of the crossbrace;
    wherein the crossbrace includes, in a substantially central region, a V-shaped cross section that evolves such that the crossbrace has an essentially trapezoidal cross section at each of the ends of the crossbrace, and
    wherein the edges have a non-rectilinear shape encouraging the edges to be tensioned when the crossbrace is subjected to torsion, the tensioning to relieve the abutment regions of stresses due to the torsion.

12. A motor vehicle, comprising:
    a flexible axle comprising:
        two longitudinal arms connected by an open-section crossbrace including flanks and a substantially horizontal flat connecting the flanks, each of the flanks having an edge running between abutment regions situated at ends of the crossbrace;
        wherein the crossbrace includes, in a substantially central region, a V-shaped cross section that evolves such that the crossbrace has an essentially trapezoidal cross section at each of the ends of the crossbrace, and
        wherein the edges have a non-rectilinear shape encouraging the edges to be tensioned when the crossbrace is subjected to torsion, the tensioning to relieve the abutment regions of stresses due to the torsion.

* * * * *